A. L. NELSON.
PISTON.
APPLICATION FILED JULY 25, 1921.

1,438,132.

Patented Dec. 5, 1922.

Inventor
Adolph L. Nelson

By

Attorney

Patented Dec. 5, 1922.

1,438,132

UNITED STATES PATENT OFFICE.

ADOLPH L. NELSON, OF INDIANAPOLIS, INDIANA.

PISTON.

Application filed July 25, 1921. Serial No. 487,252.

*To all whom it may concern:*

Be it known that I, ADOLPH L. NELSON, a citizen of the United States, residing at Indianapolis, in the county of Marion and State of Indiana, have invented certain new and useful Improvements in Pistons, of which the following is a specification.

My said invention relates to an improved piston and it is an object of the same to provide a construction in which the operation shall be practically noiseless, the "slap" being substantially, if not entirely, eliminated.

A further object is to strengthen the piston by the use of a transverse strut and reenforcing ribs.

Figure 1:
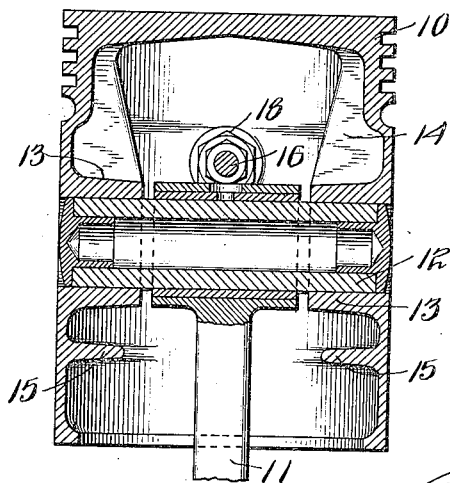
Figure 2:
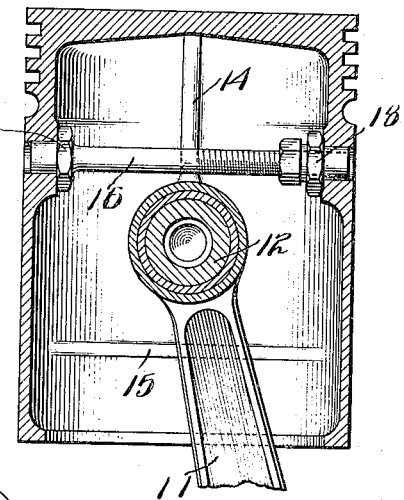
Figure 3:
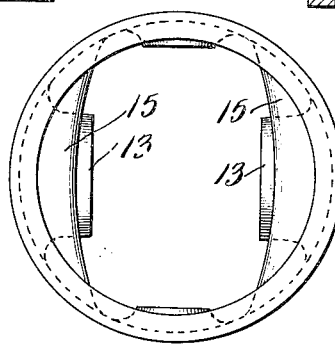
Figure 4:
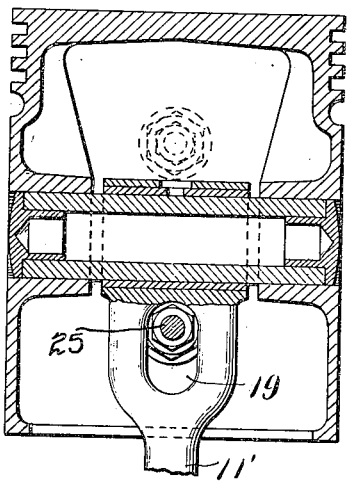
Figure 6:
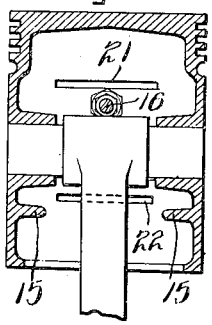
Figure 5:
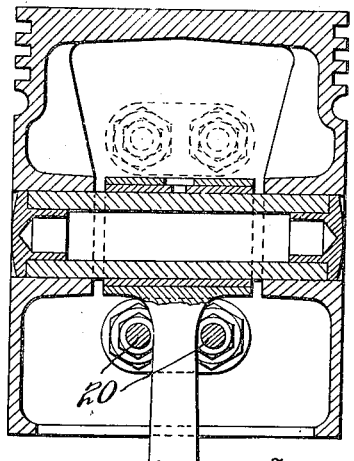

Referring to the accompanying drawings which are made a part hereof and on which similar reference characters indicate similar parts, Figure 1 shows one form of my improved piston in section, Figure 2 is a vertical section taken at right angles to Figure 1, Figure 3 a view taken from the lower end, Figure 4 a section of a modified construction, Figure 5 shows another modification, and Figure 6 shows still another modified form.

Referring to the drawings reference character 10 indicates the head of the piston which is formed of very slightly smaller diameter than the body or skirt thereof. Such difference may be about .004 of an inch in a piston of ordinary dimensions. A piston rod 11 is connected to the piston by a pin 12 of known construction and which may be of any desired type. The openings for the pin are surrounded by annular bosses 13 and vertical ribs 14 join the bosses to the adjacent part of the head.

Beneath the piston pin and extending circumferentially of the piston are a pair of inwardly extending ribs or flanges 15 of a form and relative size, for example, as shown in Figure 3. These flanges might extend completely about the piston but for difficulties encountered in manufacturing a piston so formed, their function being to increase the rigidity of the skirt of the piston which expands but little under the heat due to operation as it is distant from the point of combustion and resist the tendency of the strut strain and other influences to distort the lower end of the skirt. Said skirt will therefore hold its shape and fit closely within the cylinder whether the parts are hot or cold, it being desirable to keep the lower part of the skirt as nearly round as possible at all times. Said flanges may be positioned as desired so long as they are so located that they will hold segments of the cylinder of considerable extent rigid against distortion.

A strut 16 extends transversely of and above the piston pin and its ends engage in openings formed in bosses beneath the head of the piston. The strut preferably has near one end a fixed head 17 and near the other end a nut 18 held in place by a lock nut. If desired the strut may be formed integral with the piston, or it may be of different metal cast in place, as a rod of steel in a cylinder of aluminum or the like, but I prefer to make the same separate to secure adjustability thereof.

In the construction just described adjustment of the strut will cause the piston to expand adjacent the ends of the strut in a direction transverse to that of the wrist pins and in a region below the head, the sides becoming slightly drawn in adjacent the ends of the wrist pins, making the cylinder slightly oval in cross section at this point. The greatest expansion will, of course, occur at the weakest parts which are found at the parts of the skirt a little below the ends of the strut at each side of the piston. Such adjustment will not much affect the lower part of the skirt of the piston as the flanges 15 stiffen the same and practically prevent deformation. The slap of the piston, as is well known, takes place mainly when the engine is cold caused by excessive clearance between the piston and the cylinder. By deforming the piston when cold by means of the adjustable strut as described the diameter of the piston in the direction of the strut may be made to approach very closely to that of the cylinder thus causing a noiseless action on starting the motor. As the motor heats up the piston expands but since it is sprung out of shape at the ends of the strut or into oval form and since the strut expands much less than the piston skirt the expansion will merely tend to bring the piston back to its natural cylindrical form.

In the modification of Figure 4 the parts are similar to those of the device just described except that the piston rod 11' has a branched form leaving an aperture at 19 through which the strut 25 passes. Strut 25 may be used by itself or merely to supplement the structure shown in Figure 1, with strut 16, as indicated by dotted lines in this figure.

In the modification of Figure 5 the parts are similar to those in Figures 1 and 2 except that a pair of struts 20 are placed at opposite sides of the piston below the rod, the effect produced by adjustment of the struts being substantially similar to that in Figure 1. In such arrangement the struts might also be used above the piston pin in connection with those below. It will be noted in connection with the forms hitherto discussed that if the struts are made integral the piston should be made a little out of true cylindrical form so that as it heats up it may assume a cylindrical shape.

In the modification of Figure 6 I have shown a piston generally similar to that in Figure 1, this form however having slots 21 and 22 formed at each side thereof, the upper pair of slots being above the strut and the lower pair being below the piston openings but above the flanges 15. In a piston of this form adjustment of the strut will cause a springing out of a section of the piston bounded by slots 21 and 22 and lines joining their ends with some small consequent deformation of other parts.

It will be obvious to those skilled in the art that various other changes may be made in my piston as illustrated and described and therefore I do not limit myself to any specific form thereof, the true scope of the invention being shown by the appended claims.

Having thus fully described my said invention, what I claim as new and desire to secure by Letters Patent, is:

1. A piston having a head, a skirt extending downward therefrom, a wrist pin extending transversely of the piston, and means for springing out the sides of the skirt comprising a bolt extending transversely of the piston above the pin and at right angles thereto and engaged in openings at the opposite sides of the skirt, substantially as set forth.

2. A piston having a head, a skirt extending downward therefrom, a wrist pin extending transversely of the piston, an adjustable strut extending transversely of the piston above the pin and at right angles thereto and circumferentially extending reenforcing flanges below the bearings of the wrist pin, whereby deformation of the skirt below the wrist pin will be prevented upon adjustment of said strut, substantially as set forth.

3. A piston having a head, a skirt extending rearwardly therefrom, a wrist pin extending transversely of the skirt, said skirt having circumferentially extending reenforcing flanges, and means for springing out the sides of the skirt in a direction transversely of the piston pin, substantially as set forth.

4. In a piston, a head, a skirt extending downwardly therefrom, a wrist pin extending transversely of the skirt, and an adjustable strut at right angles thereto above the wrist pin and seated in said skirt, said piston being horizontally slotted adjacent the strut, substantially as set forth.

5. In a piston, a head, a skirt extending downwardly therefrom, a pin extending transversely of the skirt for the attachment of a connecting rod, an adjustable strut at right angles to the pin, and slots above and below the strut forming a radially expansible section of unbroken periphery in the side of the piston, substantially as set forth.

6. A piston having a head, a skirt extending downwardly therefrom, a wrist pin, the lower end of the skirt being rigid circumferentially and the intermediate portion flexible, and means to expand the skirt in a direction at right angles to the wrist pin comprising a distance piece engaging an opening at one side of the skirt and an adjustable nut on the distance piece bearing against the other side, substantially as set forth.

In witness whereof, I have hereunto set my hand and seal at Indianapolis, Indiana, this twenty-first day of July, A. D. nineteen hundred and twenty-one.

ADOLPH L. NELSON. [L. S.]

Witnesses:
E. W. BRADFORD,
CAREY S. FRYF